July 11, 1961    P. CHERKAS    2,991,558
AIR GAGE CARTRIDGE
Filed July 31, 1958

INVENTOR.
PAUL CHERKAS
BY Joseph K. Schofield
ATTORNEY

United States Patent Office 2,991,558
Patented July 11, 1961

2,991,558
AIR GAGE CARTRIDGE
Paul Cherkas, West Hartford, Conn., assignor to Pratt & Whitney Company, Incorporated, West Hartford, Conn., a corporation of Delaware
Filed July 31, 1958, Ser. No. 752,380
3 Claims. (Cl. 33—147)

This invention relates to pneumatic gaging for indicating dimensional variations of work pieces, and more particularly to an air gage cartridge for utilization with a pneumatic comparator type gage.

In the operation of pneumatic gages, the pressure drop for different nozzle clearances or dimensional variations is essentially non-linear, and only a relatively small portion of the resulting pressure vs. clearance curve is sufficiently linear to permit its adaption for practical gaging purposes.

The pneumatic circuit of an air operated dimensional gage is relatively simple. In one type of arrangement, air from a source of supply is passed through a pressure regulator and a variable restriction arranged in tandem. From this restriction, the air is conveyed to the inlet end of the gage head or air cartridge, a pressure indicating gage being connected in the conduit between the inlet of the cartridge and the variable restriction.

The cartridge is provided with a longitudinal bore and a plurality of openings furnishing communication between the bore interior and atmosphere. A slidable member or plunger is arranged for axial displacement within the bore, and adapted to variably uncover or close the openings, the amount of air permitted to escape from the cartridge through the nozzles being a function of the axial position of the slidable member within the bore. The air under pressure admitted to the cartridge inlet forces the outer end of the slidable member into contact with the work piece being gaged. The resulting pressure drop appearing in the pressure indicating gage provides the dimensional intelligence which is sought.

As previously mentioned, since the relationship between pressure drop and clearance is linear only over a small portion of its plotted curve, it becomes a problem for the operator to first calibrate the pneumatic comparator and cartridge before putting the gage to use. Moreover, the problem is further complicated when the operator is required to gage a number of pieces of different sizes over the course of a working day so that changes in range (magnification) must be accomplished quickly and preferably with the same cartridge unit.

A primary object, therefore, of the invention is to provide means to shift conveniently from one range to another with the same cartridge in a minimum of time.

In its preferred form the air cartridge for use with a pneumatic comparator gage in accordance with the present invention comprises a centrally bored body member and a member slidable therein having one end extending from the body member and adapted for contacting a work piece being gaged. The opposite end of said slidable member has portions of gradually reduced cross-sectional area. Air admitting means are provided at the end of said body member adjacent said latter areas. Escape nozzles or openings are arranged in the body member adjacent the reduced area portions and means are provided for limiting the displacement of said slidable member.

Accordingly, it is an object of the present invention to provide an improved air gage cartridge which enables the operator to quickly convert the associated pneumatic comparator gage circuit from one to another of several ranges.

A further object is to provide a novel air cartridge having reliable calibration means of simple and inexpensive construction operable at each of the plurality of ranges.

The novel features characteristic of this invention are set forth with particularity in the appended claims. The invention itself, however, both as to its organization and and method of operation, together with further objects and advantages thereof, may best be understood by reference to the following description taken in connection with the accompanying drawings in which:

Before proceeding with a description of the invention it will be helpful to briefly consider the role of the air cartridge in the practice of pneumatic comparison gaging.

Figure 1:
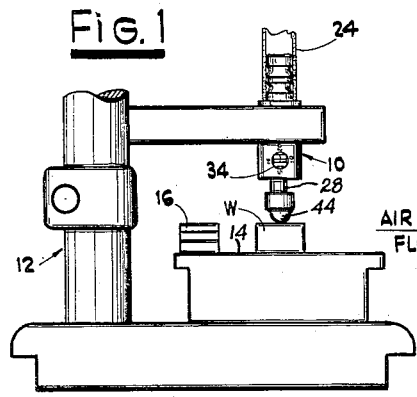
FIGURE 1 is an exemplary application of the air cartridge of this invention.
Figure 2:
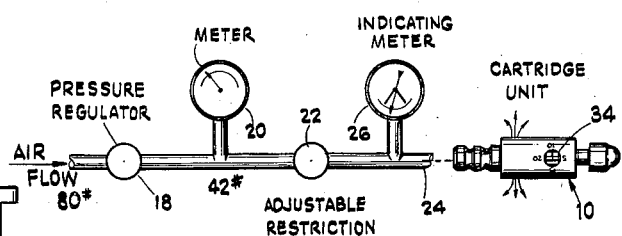
FIG. 2 is a schematic diagram of the pneumatic circuit including the air cartridge in accordance with one illustrative embodiment of the present invention.
Figure 3:
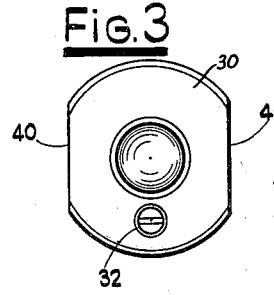
FIG. 3 is an end view of the said air cartridge.
Figure 4:
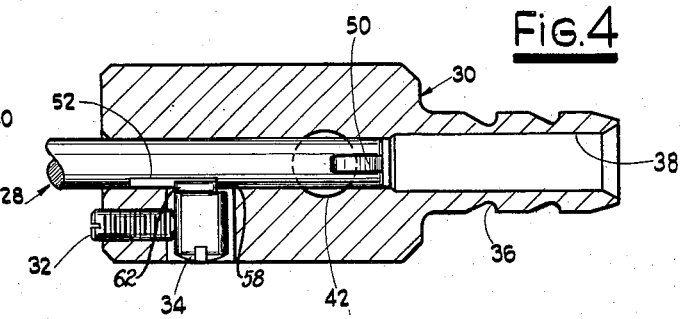
FIG. 4 is a longitudinal view in section of the air cartridge shown in FIG. 2.
Figure 5:
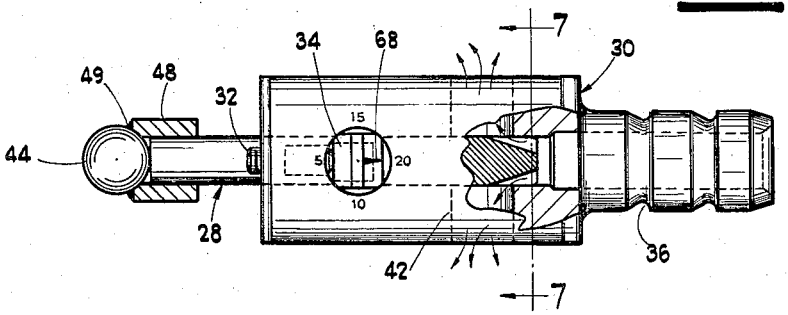
FIG. 5 is a bottom plan view of the air cartridge shown in FIG. 4, parts being shown in section to more clearly show their construction.

Referring to FIGS. 1 and 2, let us assume that a work piece W is to be checked as to its height dimension. As will be explained subsequently, the operator sets the air cartridge, indicated generally at 10, by rotating the clearance selector means 34 to the desired range of operation, viz., 0 to +.015 etc. When this is accomplished the total displacement of the plunger is fixed, and it remains to adjust the air cartridge vertically in its support stand 12 with reference to a datum plane 14 on which the work piece will be placed. In FIG. 1 the zero position of the plunger is established by means of any convenient standard such as "Hoke" blocks 16 for example. These blocks are placed on the perfectly planar surface or datum plane 14 and assembled in sufficient number to equal the desired height dimension. When the zero position is established, the better practice dictates that the magnification of the air cartridge be checked. Again "Hoke" blocks are assembled in number equal to the maximum and minimum height dimensions which will be acceptable, and the maximum and minimum excursions of the plunger are checked on the indicating meter 26 (FIG. 2)—each of these predetermined limiting positions results in particular back pressure which is then translated by suitable means into a scale reading on indicating meter 26.

The principles of operation of the comparator air gage are quite simple. Referring now particularly to FIG. 2, the air from the supply passes through a pressure regulator 18 where it is adjusted approximately to the pressure recommended by the manufacturer. This pressure is indicated by meter 20. After leaving the regulator 18, the air is fed to a restriction 22 which is connected by any suitable conduit or hose 24 to the air cartridge 10. The indicating meter 26 is arranged so as to read the pressure in the passageway between the restriction 22 and the escape nozzles.

Since the opening in the restriction 22 is rather small, there is a pressure drop across it when air is flowing. This pressure drop is directly proportional to the volume of air flowing through the system. The mass flow of air depends upon the nozzle clearance area uncovered by the plunger. The plunger is urged toward contact with the work piece W being gaged, so that the area of the nozzles open to the atmosphere is a function of the displacement of the slidable member, and hence, of the dimension being gaged.

Assume that the manufacturer has specified a pressure of 42 lbs. With the plunger held inward with the fingers, the nozzles will be completely closed and the pressure on each side of the restriction 22 will read 42 lbs. With the nozzles completely open to the atmosphere, the air pressure will approach the so-called open nozzle pressure. In this case the pressure across the restriction is about 38 p.s.i. so that the back pressure (i.e., the reading of meter 26) is 42−38=4 p.s.i.

Referring now to FIGS. 3–7, the air cartridge 10 comprises a slidable member 28, a body member 30, a set screw 32 and a clearance selector means 34.

The body member 30 includes a reduced diameter which contains annular barbs at 36 to receive a suitable fitting for a hose or conduit connection. Member 30 also contains a longitudinal bore having two different diameters, one end slidably receiving plunger 28, while the other end is slightly enlarged as shown at 38, and serves as the inlet port for the air under pressure. The sides of member 30 are machined flat at 40 so as to provide opposed parallel plane surfaces for clamping purposes. Finally there is a transverse bore at 42 which provides a pair of exit nozzles.

At one end the slidable member 28 contains a ball 44 which is secured to the shaft of member 28 by means of a sleeve 48 which is secured to ball 44 in any suitable manner at 49. The other end of the plunger 28 contains a slot 50 which has a sloping side in one dimension as may be seen in the cut-away portion of FIG. 5. The slot 50 thus provides a wedge shaped volumetric enclosure which is in communication with the transverse bore 42. As the dimensions of this wedge shaped volume are changed as a function of the longitudinal position of the slidable member 28, the volume of air which is exhausted to atmosphere is varied. The wedge configuration of this volume may be verified from a study of FIG. 5 in conjunction with FIGS. 4 and 7. Intermediate the ends of the plunger 28 is a longitudinally extending flattened surface 52.

Figures 6A, 6B, 6C:
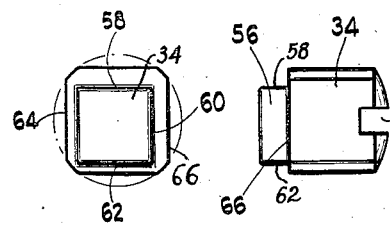
FIGS. 6a, 6b and 6c are left side, front elevation and right side views respectively of the clearance selector member utilized with said air cartridge.
Figure 7:
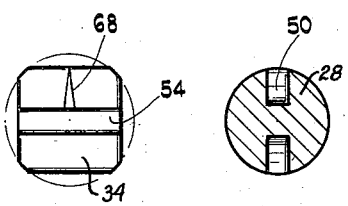
FIG. 7 is a cross-sectional view of the slidable member taken along the line 7—7 of FIG. 5.

The clearance selector means 34 is shown in greater detail in FIGS. 6a, 6b and 6c. Means 34 comprises a plug which is slotted at 54 to assist rotational displacement thereof. At the other end means 34 contains a rectangular projection 56 which is machined so that its four sides 58, 60, 62, 64 are unequally spaced from the axis of the main body portion 66. This may be observed best in the view depicted in FIG. 6b. An indicating mark is placed at 68 as shown in FIG. 6c. As will presently be made clear, the clearance selector means 34 may be rotated within a close fitting transverse opening in the body member 30 so that any one of its edges 58, 60, 62, 64 may be brought into position so as to provide arresting means for one of the end edges of the flattened surface 52 thereby limiting the overall displacement of the plunger 28. In the view shown in FIG. 4, the surface 58 is in abutting relation with an end edge of the flattened surface 52 in the shaft. Thus displacement of the member 28 to the left is arrested; similarly, edge 62 limits the overall displacement in the right hand direction of travel as viewed in FIG. 4.

The operation and use of the air cartridge should be sufficiently clear at this point so that further explanation is unnecessary.

While a specific embodiment has been shown and described, it will of course, be understood that various modifications may yet be devised by those skilled in the art which may embody the principles of the invention and which will be found to be within the true spirit and scope thereof.

What is claimed is:

1. An air gage cartridge comprising a hollow body member, a member slidable therein having one end extending from said body member and adapted for contacting a work piece, the opposite end of said slidable member having portions of gradually reduced cross-sectional area, air admitting means at the end of said body member adjacent said area, said body member having transverse escape passages communicating with said portions of said slidable member of reduced area, and a rotatable member housed in said body member to variably limit the movement of said slidable member in one direction, whereby variable amounts of air may escape past said reduced area portions of said slidable member and through the escape passages in said body member with said slidable member in its limiting positions.

2. An air gage cartridge comprising a centrally bored body member, a member slidable therein having one end extending from the body member and adapted for contracting a work piece, the opposite end of said slidable member having portions of gradually reduced cross-sectional area, air admitting means at the end of said body member adjacent said area, body member having air escape ports therein communicating with the portions of said slidable member of reduced area, and a member rotatably mounted within the body member to limit the movement of said slidable member in one direction to predetermined different positions, said rotatably mounted member having surfaces at different distances from its axis of rotation to determine the limiting position of said slidable member in its different positions of adjustment.

3. An air gage cartridge comprising a body member having a longitudinal bore, a member slidable therein having one end extending from the body member adapted for contacting a work piece, said slidable member including a longitudinally extending flattened surface, the opposite end of said slidable member having a tapered longitudinally extending slot of successive predetermined cross-sectional areas in the direction of displacement of said slidable member, air admitting means at the end of said body member adjacent said areas, said body member having escape nozzles adapted to variably communicate with said tapered slot as a function of the displacement of said slidable member, and limiting means comprising a rotatable member mounted in said body member having a plurality of surfaces of predetermined distances from its axis of rotation, any selected surface of said rotatable member being adapted to engage an end of said longitudinally flattened surface, whereby the position of said slidable member in one direction of its movement is limited by the particular surface of said rotatable member engaged by an end of said flattened surface.

References Cited in the file of this patent

UNITED STATES PATENTS

| 2,691,827 | Aller | Oct. 19, 1954 |
| 2,831,257 | Aller | Apr. 22, 1958 |
| 2,898,683 | Kiefaber | Aug. 11, 1959 |